(12) United States Patent
Tsubaki

(10) Patent No.: US 9,663,143 B2
(45) Date of Patent: May 30, 2017

(54) CONTROL UNIT FOR ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Shinagawa-ku, Tokyo (JP)

( * ) Notice: Subject to any disclaimer, the term of this patent is extended or adjusted under 35 U.S.C. 154(b) by 0 days.

(21) Appl. No.: 14/420,812

(22) PCT Filed: Aug. 22, 2014

(86) PCT No.: PCT/JP2014/071964
§ 371 (c)(1),
(2) Date: Feb. 10, 2015

(87) PCT Pub. No.: WO2015/025942
PCT Pub. Date: Feb. 26, 2015

(65) Prior Publication Data
US 2016/0251028 A1    Sep. 1, 2016

(30) Foreign Application Priority Data

Aug. 22, 2013   (JP) ................................ 2013-172369

(51) Int. Cl.
*B62D 6/00*     (2006.01)
*B62D 5/04*     (2006.01)

(52) U.S. Cl.
CPC ............. *B62D 6/008* (2013.01); *B62D 5/046* (2013.01); *B62D 5/0463* (2013.01); *B62D 5/0472* (2013.01)

(58) Field of Classification Search
None
See application file for complete search history.

(56) References Cited

U.S. PATENT DOCUMENTS

| 9,327,761 | B2 * | 5/2016 | Tsubaki ............... B62D 5/0463 |
| 2008/0217099 | A1 * | 9/2008 | Reungwetwattana B62D 5/0472 180/446 |

(Continued)

FOREIGN PATENT DOCUMENTS

| JP | 08-290778 A | 11/1996 |
| JP | 10-310072 A | 11/1998 |

(Continued)

OTHER PUBLICATIONS

International Search Report of PCT/JP2014/071964 dated Nov. 25, 2014 [PCT/ISA/210].

(Continued)

*Primary Examiner* — Mussa A Shaawat
*Assistant Examiner* — Abdhesh Jha
(74) *Attorney, Agent, or Firm* — Sughrue Mion, PLLC

(57) ABSTRACT

A control unit for an electric power steering apparatus that controls a motor based on a current command value (2) calculated based on a current command value (1) due to steering torque generated on a steering shaft and a current detection value of the motor providing a steering mechanism with a steering assist force. The apparatus includes an SAT estimating section that inputs a motor angular velocity, a motor angular acceleration, the current command value (1) and the steering torque, and estimates a self-aligning torque (SAT) or measures by a sensor; and a feedback section that processes the estimated SAT value and outputs an SAT compensation value. The feedback section comprises a BPF, a dead band section, a steering torque sensitive gain section and a vehicle velocity sensitive gain section. The current command value (2) is obtained by adding the SAT compensation value to the current command value (1).

4 Claims, 5 Drawing Sheets

(56) References Cited

U.S. PATENT DOCUMENTS

2009/0271069 A1* 10/2009 Yamamoto ............. B62D 6/008
                                                                701/41
2010/0168963 A1*  7/2010 Yamamoto ........... B62D 5/0463
                                                                701/42

FOREIGN PATENT DOCUMENTS

| JP | 2006-335228 A | 12/2006 |
| JP | 2007-302017 A | 11/2007 |
| JP | 2008-018825 A | 1/2008 |
| JP | 2009-051278 A | 3/2009 |
| JP | 2009-280163 A | 12/2009 |
| JP | 2011-121383 A | 6/2011 |
| JP | 4715212 B2 | 7/2011 |
| WO | 2011/052470 A1 | 5/2011 |

OTHER PUBLICATIONS

Written Opinion of PCT/JP2014/071964 dated Nov. 25, 2014 [PCT/ISA/237].

* cited by examiner

PRIOR ART

CONTROL UNIT FOR ELECTRIC POWER STEERING APPARATUS

CROSS REFERENCE TO RELATED APPLICATIONS

This application is a National Stage of International Application No. PCT/JP2014/071964, filed Aug. 22, 2014, claiming priority based on Japanese Patent Application No. 2013-172369, filed Aug. 22, 2013, the contents of all of which are incorporated herein by reference in their entirety.

TECHNICAL FIELD

The present invention relates to a control unit for an electric power steering apparatus (EPS) that provides a steering system of an automobile or a vehicle with an assist force generated by a motor, and in particular to a control unit for an electric power steering apparatus that improves a steering feeling by temperately suppressing a transmission of a shock from a handle (steering wheel) to a driver at a shock occurrence time such as a curbstone hitting or the like.

BACKGROUND ART

An electric power steering apparatus energizes a steering mechanism of an automobile or a vehicle by means of a rotational torque of a motor, applies a driving force of the motor to a steering shaft or a rack shaft by means of a transmission mechanism such as gears or a belt through a reduction mechanism. In order to accurately generate an assist torque (steering assist torque), such a conventional electric power steering apparatus performs a feedback control of a motor current. The feedback control adjusts a voltage supplied to the motor so that a difference between a current command value and a detected motor current value becomes small, and the adjustment of the voltage applied to the motor is generally performed by an adjustment of duty ratios of a pulse width modulation (PWM) control.

A general configuration of the conventional electric power steering apparatus will be described with reference to FIG. 1. As shown in FIG. 1, a column shaft (a steering shaft) 2 connected to a steering wheel 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque Tr of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a current command value of an assist (steering assist) command based on a steering torque Tr detected by the torque sensor 10 and a vehicle velocity Vel detected by a vehicle velocity sensor 12, and controls a current supplied to the motor 20 based on a voltage control value E obtained by performing compensation with respect to the steering assist command value. Moreover, it is also possible to receive the vehicle velocity Vel from a controller area network (CAN) or the like.

In such the electric power steering apparatus, for example as disclosed in Japanese Published Unexamined Patent Application No. H8-290778 (Patent Document 1), by means of a robust stabilizing compensator within the control unit 100, a stability of the system and sensitivity characteristics of a road information and a disturbance information are simultaneously designed. However, in such the conventional control unit, since a reaction force during steering in the vicinity of a steering neutral point is small, it is difficult to accurately transmit the road information to a driver due to an influence of friction. Further, in the conventional electric power steering apparatus, it is difficult to set a hysteresis characteristic between a steering angle and a steering force to a characteristic at the same level as a hydraulic power steering apparatus.

As an electric power steering apparatus for dissolving the above problems, there has been proposed the control unit disclosed in Japanese Patent No. 4715212 B2 (Patent Document 2) by the present applicant.

In the control unit disclosed in Patent Document 2, as shown in FIG. 2, the motor 20 for generating the steering assist torque of the steering apparatus is driven by a motor driving section 21, the motor driving section 21 is controlled by the control unit 100 indicated by a dashed-two dotted line, and the steering torque Tr from the torque sensor and the vehicle velocity Vel from the vehicle velocity sensor are inputted into the control unit 100. In the motor 20, a motor inter-terminal voltage Vm and a motor current value i are measured and they are inputted into the control unit 100.

The control unit 100 comprises a torque system control unit 110 indicated by a dashed line that performs a control by using the steering torque Tr and a motor system control unit 120 indicated by a dashed-dotted line that performs a control relating to driving of the motor 20. The torque system control unit 110 comprises an assist amount calculating section 111, a differential control section 112, a yaw rate convergence control section 113, a robust stabilization compensating section 114 and a self-aligning torque (SAT) estimating section 117 and a feedback section 118, and further includes addition sections 116A, 116B and 116C. Further, the motor system control unit 120 comprises a compensating section 121, a disturbance estimating section 122, a motor angular velocity calculating section 123, a motor angular acceleration calculating section 124, a motor characteristic compensating section 125, and addition sections 126A and 126B.

The steering torque Tr is inputted into the assist amount calculating section 111, the differential control section 112, the yaw rate convergence control section 113 and the SAT estimating section 117, and all of them input the vehicle velocity Vel as a parameter. The assist amount calculating section 111 calculates an assist torque amount based on the steering torque Tr. The yaw rate convergence control section 113 inputs the steering torque Tr and a motor angular velocity ω, and brakes a movement that the steering wheel whirls to improve the convergence of yaw of the vehicle. Further, the differential control section 112 enhances a control responsibility in the vicinity of a neutral point of the steering and realizes a smooth steering. Moreover, the SAT estimating section 117 inputs the steering torque Tr, a current command value Iref1 which is a signal obtained in the addition section 116A by adding the output of the differential control section 112 to the output of the assist amount calculating section 111, the motor angular velocity ω calculated by the motor angular velocity calculating section 123 and a motor angular acceleration *ω from the motor angular acceleration calculating section 124 to estimate an SAT, performs signal processing by using the feedback section 118 with respect to the estimated SAT value *SAT and obtains an SAT compensation value *SATc. Then, the compensation is performed by adding the SAT compensation value *SATc to the current command value Iref3 from the robust stabilization compensating section 114 at the addition section 116C so as to provide the steering wheel with suitable road information as a reaction force.

Further, a signal that is obtained in the addition section 116B by adding the output of the yaw rate convergence control section 113 to a signal obtained in the addition section 116A by adding the output of the differential control section 112 to the output of the assist amount calculating section 111, is inputted into the robust stabilization compensating section 114 as a current command value Iref2. For example, the robust stabilization compensating section 114 is a compensating section disclosed in Japanese Published Unexamined Patent Application No. H8-290778 A, removes peak values in a resonance frequency of a resonance system comprised of an inertia element and a spring element that are included in the detected torque, and compensates a phase shift of the resonance frequency that disturbs the responsibility and the stability of the control system. By adding the output *SATc of the feedback section 118 to the output Iref3 of the robust stabilization compensating section 114 in the addition section 116C, a current command value Iref4 capable of transmitting the road information to the steering wheel as the reaction force, is obtained.

Moreover, the motor angular velocity calculating section 123 calculates the motor angular velocity ω based on the motor inter-terminal voltage Vm and the motor current value i, and the motor angular velocity ω is inputted into the motor angular acceleration calculating section 124, the yaw rate convergence control section 113 and the SAT estimating section 117. The motor angular acceleration calculating section 124 calculates the motor angular acceleration *ω based on the inputted motor angular velocity ω, and the calculated motor angular acceleration *ω is inputted into the motor characteristic compensating section 125. The output Ic of the motor characteristic compensating section 125 is added with the current command value Iref4 in the addition sections 126A, the current command value Iref5 being the addition result is inputted into the compensating section 121 comprising a proportional (P) control, a differential (D) control and so on. A current command value Iref6 compensated in the compensating section 121 is added with an output of the disturbance estimating section 122 in the addition section 126B, and a current command value Iref7 being the addition result is inputted into the motor driving section 21 and the disturbance estimating section 122. The disturbance estimating section 122 is an apparatus disclosed in Japanese Published Unexamined Patent Application No. H8-310417 A, is capable of maintaining a desired motor control characteristic in an output reference of the control system based on the current command value Iref7 and the detected motor current value i, and does not lose the stability of the control system.

Further, the SAT estimating section 117 inputs the steering torque Tr, the motor angular velocity ω, the motor angular acceleration *ω and the current command value (assist amount calculation result) and estimates an SAT by using a conventionally well-known method. The estimated SAT value *SAT is processed in the feedback section 118 and the processed SAT compensation value *SATc is inputted into the addition section 116C. For example, the configuration of the feedback section 118 is shown in FIG. 3, and the feedback section 118 comprises a vehicle velocity sensitive high pass filter (HPF) 118-1 and a vehicle velocity sensitive gain section 118-3. The high pass filter 118-1 inputs the estimated SAT value *SAT and outputs a high frequency component, and the gain section 118-3 multiplies with a gain G.

In FIG. 3, "J" indicates inertia, "Fr" friction (static friction) and "Tm" an assist torque.

THE LIST OF PRIOR ART DOCUMENTS

Patent Documents

Patent Document 1: Japanese Published Unexamined Patent Application No. H8-290778 A
Patent Document 2: Japanese Patent No. 4715212 B2

SUMMARY OF THE INVENTION

Problems to be Solved by the Invention

According to the apparatus disclosed in Patent Document 2, it allows the estimated SAT value *SAT as an estimated reaction force value to pass the high pass filter 118-1 and compensates the current command value by extracting a reaction force component not to desire to transmit to a driver and by adding to the current command value. Due to the processing, it is possible to positively negate the reaction force not to desire to transmit to the driver. Since it is impossible to favorably reduce the reaction force if the estimated SAT value *SAT is directly added, the gain G is multiplied and then the multiplied value is added.

As stated above, the apparatus of Patent Document 2 estimates the SAT, obtains the compensation value by multiplying the vehicle velocity sensitive gain via the feedback section and positively negate the disturbance to be suppressed. However, nevertheless there is uncomfortable shock not to desire to transmit to the driver at a time of a curbstone hitting, a cobblestoned road transit or the like, the apparatus of Patent Document 2 does not disclose the countermeasures. Accordingly, if a great SAT is generated at a time of a shock occurrence, the generated SAT is directly transmitted to the driver and there is a possibility to hurt the steering feeling.

The present invention has been developed in view of the above-described circumstances, and an object of the present invention is to provide a control unit for an electric power steering apparatus that, even if a great input (external force) from outside is given when the shock such as the curbstone hitting occurs, is capable of temperately suppressing the shock transmission to the driver only at a time of the shock occurrence, without an influence to the ordinary steering.

Means for Solving the Problems

The present invention relates to a control unit for an electric power steering apparatus that controls a motor on a basis of a current command value 2 which is calculated based on a current command value 1 due to a steering torque generated on a steering shaft and a current detection value of said motor which provides a steering mechanism with an a steering assist force, the above-described object of the present invention is achieved by that comprising: an SAT estimating section that inputs a motor angular velocity, a motor angular acceleration, said current command value 1 and said steering torque, and estimates a self-aligning torque (SAT) or measures by a sensor; and a feedback section that processes said estimated SAT value and outputs an SAT compensation value; wherein said feedback section comprises a BPF, a dead band section, a steering torque sensitive gain section and a vehicle velocity sensitive gain section, and wherein said current command value 2 is obtained by adding said SAT compensation value outputted from said feedback section to said current command value 1.

Further, the above-described object of the present invention is more effectively achieved by that wherein said dead band section has a characteristic of thresholds with an offset; or wherein a gain of said steering torque sensitive gain section is a constant value 1 when said steering torque is less than a predetermined torque 1, gradually falls to a constant value 2 (<constant value 1) when said steering torque is equal to said predetermined torque 1 or more, and is said constant value 2 when said steering torque exceeds said predetermined torque 2; or wherein a gain of said vehicle velocity sensitive gain section is a constant value when said vehicle velocity is less than a predetermined vehicle velocity, and gradually falls when said vehicle velocity exceeds said predetermined vehicle velocity; or wherein a limiter is provided at a rear stage of said feedback section, and an upper limit and a lower limit of said SAT compensation value are limited.

Effects of the Invention

According to a control unit for an electric power steering apparatus of the present invention, there is provided an SAT estimating section that estimates a self-aligning torque (SAT) or measures by a sensor, and the estimated SAT value (including the measured value) which is estimated at the SAT estimating section is processed to an SAT compensation value via a BPF to extract a frequency band to be compensated, a dead band section having a threshold characteristic with an offset, a feedback section comprising a steering torque sensitive gain section and a vehicle velocity sensitive gain section. The compensation is performed by adding the SAT compensation value to the current command value. In this way, the control unit for an electric power steering apparatus according to the present invention that, even if a great input (external force) from outside is given when the shock such as the curbstone hitting occurs, is capable of temperately suppressing the shock transmission to the driver only at a time of the shock occurrence, without an influence to the ordinary steering.

It is possible to temperately limit the upper limit and the lower limit of the SAT compensation value by providing the limiter at a final stage of the feedback section.

MODE FOR CARRYING OUT THE INVENTION

The present invention provides a dead band having a threshold with an offset in a feedback route (feedback section) of an estimated SAT value and moderates an uncomfortable shock not to desire to transmit to a driver only at a time of shock occurrence of a curbstone hitting, cobblestoned road transit or the like. Since a great force (SAT) is generated from outside at a time of a shock occurrence such as the curbstone hitting, it is possible to temperately suppress the shock transmission to the driver only at a time of shock occurrence without an influence to the ordinary steering by compensating a current command value corresponding to the level of the external force.

Further, the present invention extracts, for the estimated SAT value which is estimated at an SAT estimating section (or measurement with a sensor), only frequency band to be compensated and effectively performs a control. A band pass filter (BPF) or a combination of a low pass filter (LPF) and a high pass filter (HPF) is used for the extraction of the frequency band.

Hereinafter, embodiments of the present invention will be described in detail with reference to FIG. 4 corresponding to FIG. 3.

Figure 1:
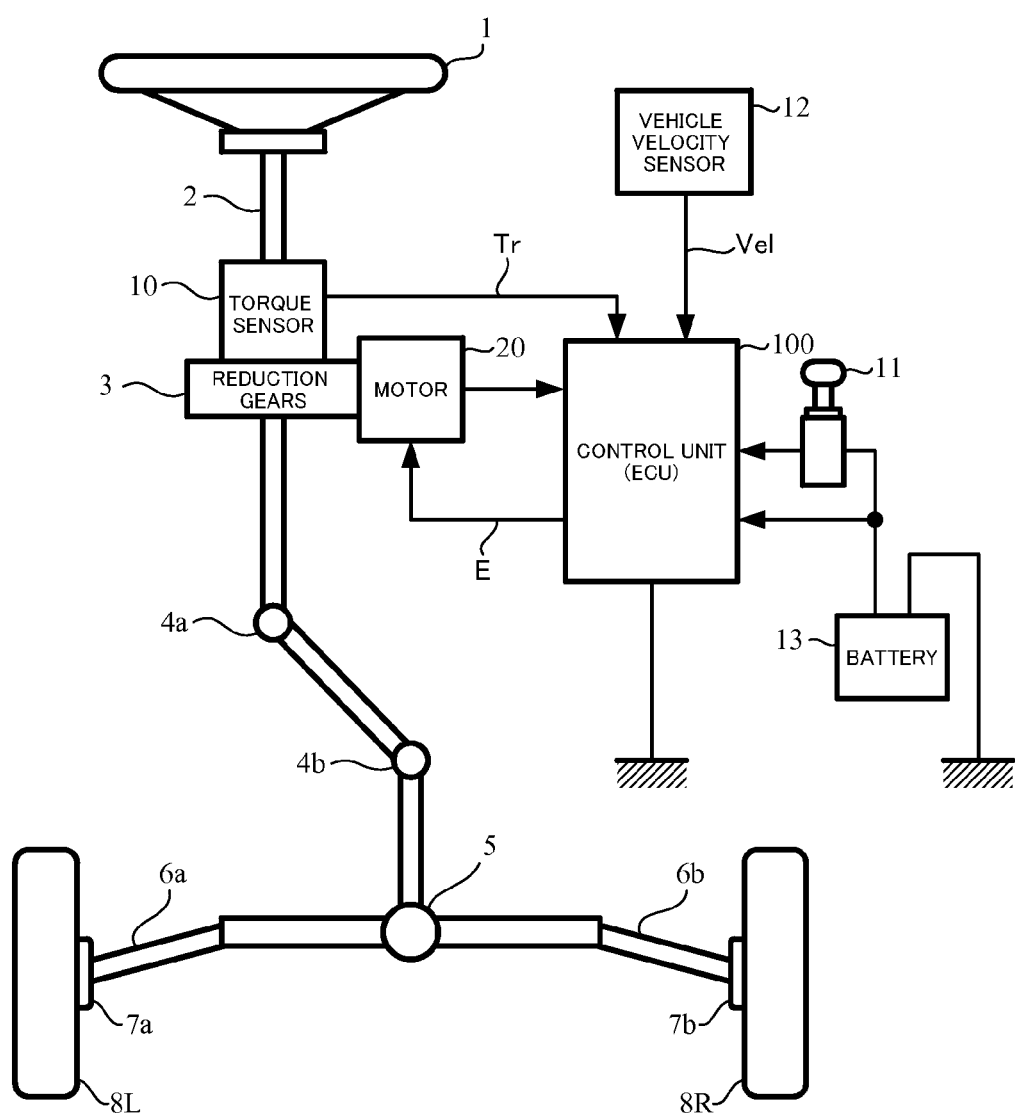
FIG. 1 is a configuration diagram illustrating a general outline of an electric power steering apparatus.
Figure 2:
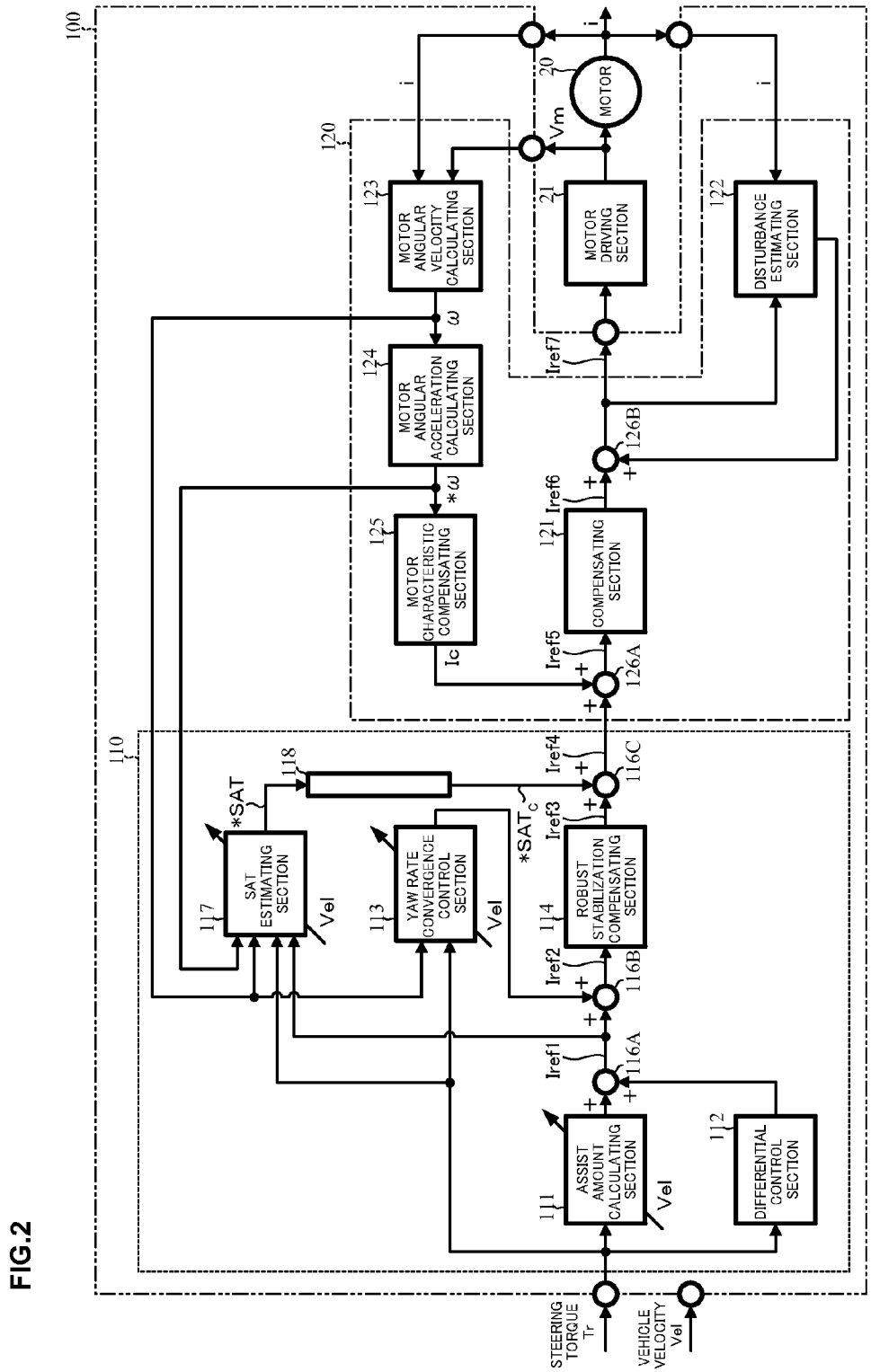
FIG. 2 is a block diagram showing a configuration example of a control unit (ECU) of the electric power steering apparatus.
Figure 3:
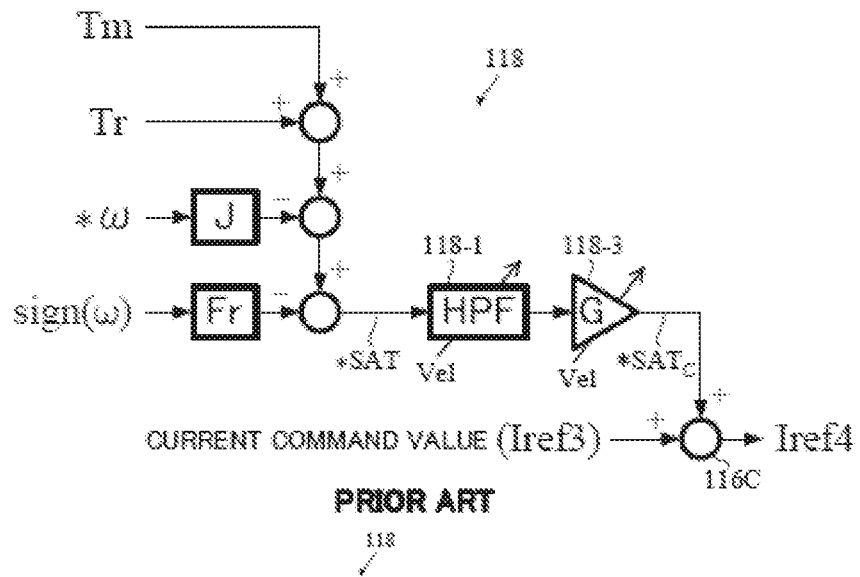
FIG. 3 is a block diagram showing a configuration example of the feedback section.

The SAT estimating section 117 using in the present invention is the same with the conventional configuration shown in FIG. 3. Although the estimated SAT value *SAT is outputted from the SAT estimating section 117 and is processed in the feedback section, the configuration of the feedback section according to the present invention is different from the conventional section (FIG. 3).

Figure 4:
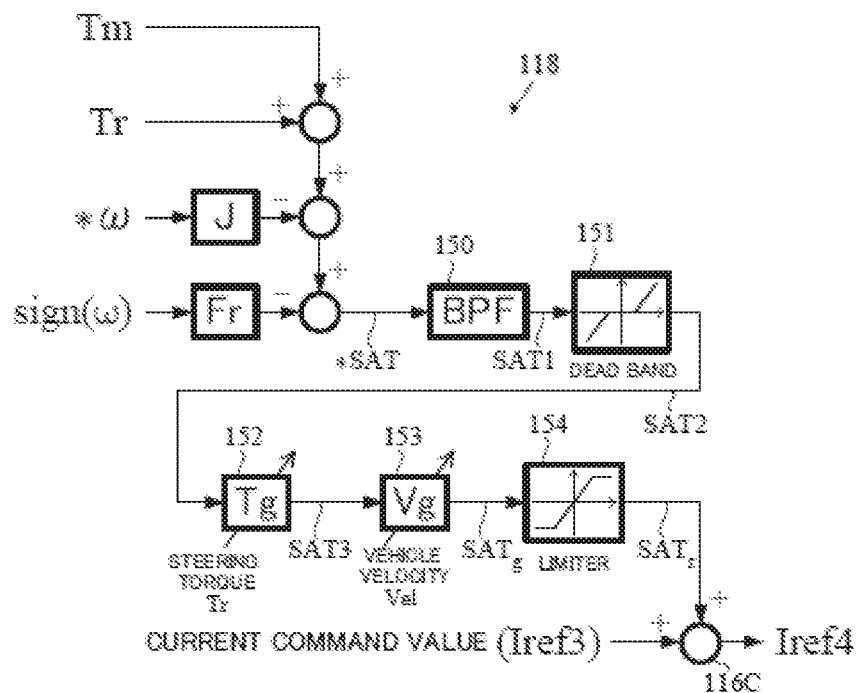
FIG. 4 is a block configuration diagram showing an embodiment of the present invention.

That is, the feedback section according to the present invention comprises, as shown in FIG. 4, a band pass filter (BPF) 150 to extract a frequency band to be compensated from the estimated SAT value *SAT, a dead band section 151 having a dead band (tuning is possible) comprising a characteristic of thresholds with an offset, a steering torque sensitive gain section 152 to multiply a gain Tg which is sensitive for the steering torque Tr and is variable, a vehicle velocity sensitive gain section 153 to multiply a gain Vg which is sensitive for the vehicle velocity Vel and is variable, and a limiter 154 to limit an upper limit and a lower limit of an SAT compensation value SATr outputted from the gain section 153.

The BPF 150 extracts a frequency component (e.g. 1 to 20 Hz) of the frequency band to be compensated and outputs, and comprises s secondary-order filter, a fourth-order filter or the like. For example, the BPF 150 is a BPF such as a combined configuration of a first-order low pass filter (LPF) and a first-order high pass filter (HPF). The cut-off frequency of the first-order LPF is 20 Hz for removing a high-frequency noise component and the cut-off frequency of the first-order HPF is 1 Hz for improving a steering feeling of a driver.

Figure 5:
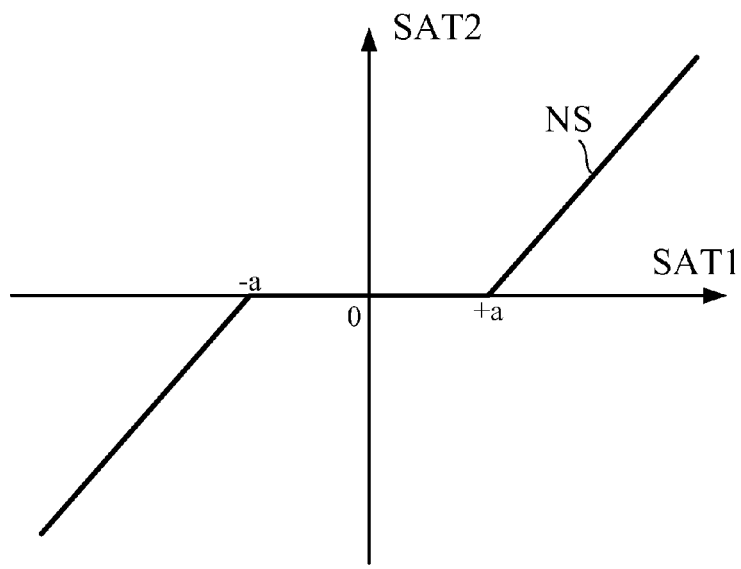
FIG. 5 is a characteristic diagram showing a characteristic example of a dead band section.

Although the dead band section 151 has a dead band (thresholds) "±a" as shown in FIG. 5, the dead band is capable of setting an optional value. Further, the positive and negative thresholds may are different each other and the inclination of the characteristic NS indicating the gain is also capable of setting an optional value. When the estimated SAT value SAT1 outputted from the BPF 150 is within a range (in FIG. 5, "±a"), the dead band section 151 outputs "0" by regarding that the shock is small. When the estimated SAT value SAT1 becomes outside of the range, the BPF 150 outputs a value which is offset to the dead band set value "0"-direction. That is, the BPF 150 outputs the estimated SAT value SAT2 for the compensation current by regarding that the shock occurs. By providing the dead band as stated above, it is possible to extremely suppress the influence to the steering feeling for the shock such as curbstone hitting.

Figure 6:
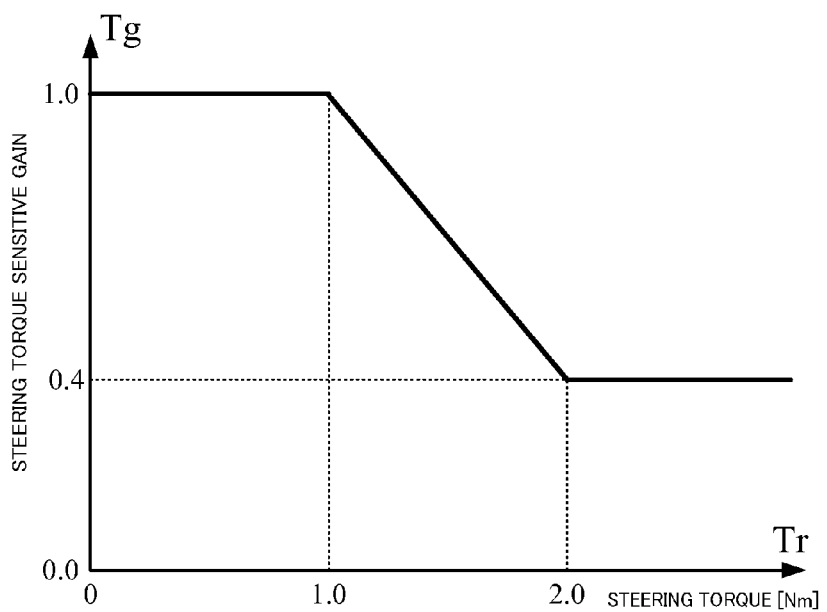
FIG. 6 is a characteristic diagram showing an example of a steering torque sensitive gain using in the present invention.

The steering torque sensitive gain section 152 has a characteristic as shown in FIG. 6. That is, the gain Tg of the steering torque sensitive gain section 152 is a constant gain Tg=1.0 until the steering torque Tr becomes a predetermined torque 1 (in FIG. 6, 1.0 Nm). When the steering torque Tr becomes equal to the predetermined torque 1 or more, the gain Tg linearly falls to a constant value 2 (in FIG. 6, "0.4") in correspondence with the increasing of the steering torque Tr. Then, when the steering torque Tr exceeds the predetermined torque 2 (in FIG. 6, 2.0 Nm), the gain Tg is held at the constant value (in FIG. 6, "0.4"). The steering torque sensitive gain section 152 multiplies the estimated SAT value SAT2 with the gain Tg and outputs the estimated SAT value SAT3 (=Tg·SAT2). Although the gain Tg linearly falls between the predetermined values 1 and 2 in the embodiment shown in FIG. 6, it may be non-linear.

Figure 7:
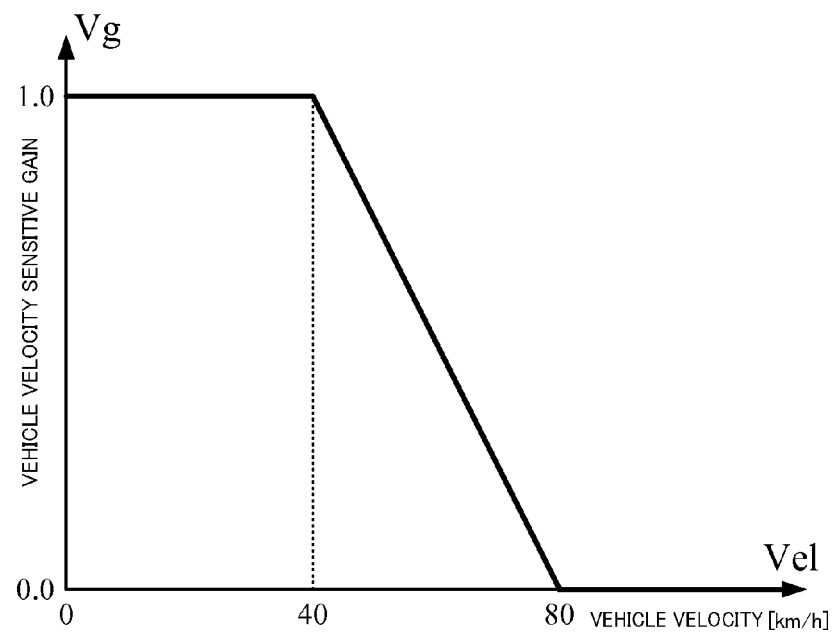
FIG. 7 is a characteristic diagram showing an example of a vehicle velocity sensitive gain using in the present invention.

Furthermore, the vehicle velocity sensitive gain section 153 has a characteristic as shown in FIG. 7. That is, the gain Vg of the vehicle velocity sensitive gain section 153 is a constant gain Vg=1.0 until the vehicle velocity Vel becomes a predetermined vehicle velocity (in FIG. 7, 40 km/h). When the vehicle velocity Vel becomes equal to the predetermined vehicle velocity or more, the gain Vg linearly falls in correspondence with the increasing of the vehicle velocity Vel. Then, when the vehicle velocity Vel exceeds the predetermined vehicle velocity (in FIG. 7, 80 km/h), the gain Vg become "0" and is held. The vehicle velocity sensitive gain section 153 multiplies the estimated SAT value SAT3 with the gain Vg and outputs the SAT compensation value SATg (=Vg·SAT3). Although the gain Vg linearly falls between "0" and the predetermined value in the embodiment shown in FIG. 7, it may be non-linear.

In such a configuration, as stated above, the SAT estimating section 117 inputs the steering torque Tr, the motor angular velocity ω, the motor angular acceleration *ω and the current command value (the addition result at the addition section 116A) and estimates the SAT. The estimated SAT value *SAT is inputted into the feedback section 118 and is processed. The processed the SAT compensation value SATr is added to the current command value (Iref3) and is compensated.

In the feedback section 118, the estimated SAT value *SAT is firstly inputted into the band pass filter (BPF) 150 to extract the frequency band to be compensated, and then the SAT value SAT1 of the extracted frequency band is inputted into the dead band section 151 having a predetermined dead band. Bypassing through the dead band section 151, when the estimated SAT value SAT1 is within a range (in FIG. 5, "±a"), the dead band section 151 outputs "0" by regarding that the shock is small. When the estimated SAT value SAT1 becomes outside of the range, the BPF 150 outputs the estimated SAT value SAT2 for the compensation current by regarding that the shock occurs.

The estimated SAT value SAT2 is multiplied with the gain Tg in correspondence with the steering torque Tr at the steering torque sensitive gain section 152, the estimated SAT value SAT3 being the multiplied result is multiplied with the gain Vg in correspondence with the vehicle velocity Vel at the vehicle velocity sensitive gain section 153, and the SAT compensation value SATg being the multiplied result is outputted.

The upper limit and lower limit of the SAT compensation value SATg are limited at the limiter 154 and the limited signal is outputted as the SAT compensation value SATr. The SAT compensation value SATr is added to the current command value (Iref3) and a new current command value (Iref4) is generated. As a result, the influence to the steering feeling at a time of a shock occurrence from the road surface is extremely suppressed.

Figure 8:
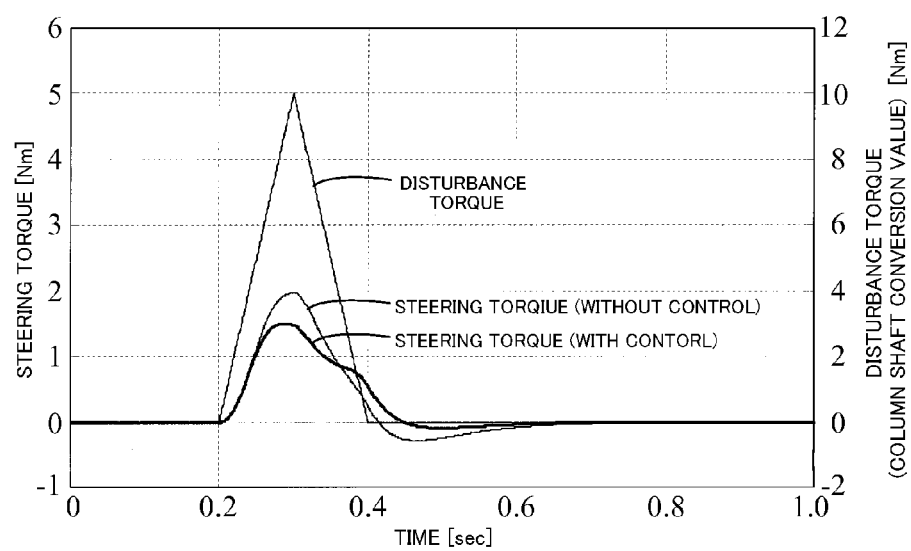
FIG. 8 is a characteristic diagram for explaining the effects of the present invention.

FIG. 8 is a characteristic diagram for explaining the effects of the present invention and shows a time response of the steering torque when the disturbance torque is given. According to the control of the present invention, it is obvious that the occurrence of the steering torque is suppressed.

Moreover, although the frequency band to be compensated is extracted by the BPF as described above, it may be a combination of the LPF and the HPF. Although the BPF is provided at a front stage of the dead band section in the above embodiment, the BPF or the combination of the LPF and the HPF may be provided at a rear stage of the dead band section. Further, it may be that the LPF or the HPF is provided at the front stage of the dead band section and the HPF or the LPF is provided at the rear stage of the dead band section.

EXPLANATION OF REFERENCE NUMERALS

1 handle (steering wheel)
2 reduction gears
10 torque sensor
12 vehicle velocity sensor
20 motor
21 motor driving section
100 control unit (ECU)
110 torque system control unit
111 assist amount calculating section
112 differential control section
113 yaw rate convergence control section
114 robust stabilization compensating section
117 SAT estimating section
118 feedback section
120 motor system control unit
121 compensating section
122 disturbance estimating section
123 motor angular velocity calculating section
124 motor angular acceleration calculating section
125 motor characteristic compensating section
150 band pass filter (BPF)
151 dead band section
152 steering torque sensitive gain section (Tg)
153 vehicle velocity sensitive gain section (Vg)
154 limiter

The invention claimed is:

1. A control unit for an electric power steering apparatus that controls a motor on a basis of a current command value 2 which is calculated based on a current command value 1 due to a steering torque generated on a steering shaft and a current detection value of said motor which provides a steering mechanism with a steering assist force, comprising:
   an SAT estimating section that inputs a motor angular velocity, a motor angular acceleration, said current command value 1 and said steering torque, and estimates a self-aligning torque (SAT); and
   a feedback section that processes said estimated SAT value and outputs an SAT compensation value;
   wherein said feedback section comprises:

a band pass filter (BPF) to extract a frequency band to be compensated form said estimated SAT value;

a dead band section comprising a characteristic of threshold with an offset and being provided at a rear state of said BPF;

a steering torque sensitive gain section to multiply a gain Tg which is sensitive for said steering torque and is variable, and being provided at a rear stage of said dead band section;

a vehicle velocity sensitive gain section to multiply a gain Vg which is sensitive for said vehicle velocity and is variable, and being provided at a rear stage of said steering torque sensitive gain section; and a limiter being provided at a rear stage of said vehicle velocity sensitive gain section, and to limit an upper and a lower limit of said SAT compensation value;

wherein said current command value 2 is obtained by adding said SAT compensation value outputted from said feedback section to said current command value 1.

2. A control unit for an electric power steering apparatus according to claim 1, wherein a gain of said steering torque sensitive gain section is a constant value 1 when said steering torque is less than a predetermined torque 1, gradually falls to a constant value 2 (<constant value 1) when said steering torque is equal to said predetermined torque 1 or more, and is said constant value 2 when said steering torque exceeds said predetermined torque 2.

3. A control unit for an electric power steering apparatus according to claim 1, wherein a gain of said vehicle velocity sensitive gain section is a constant value when said vehicle velocity is less than a predetermined vehicle velocity, and gradually falls when said vehicle velocity exceeds said predetermined vehicle velocity.

4. A control unit for an electric power steering apparatus according to claim 2, wherein a gain of said vehicle velocity sensitive gain section is a constant value when said vehicle velocity is less than a predetermined vehicle velocity, and gradually falls when said vehicle velocity exceeds said predetermined vehicle velocity.

* * * * *